Figure 1:
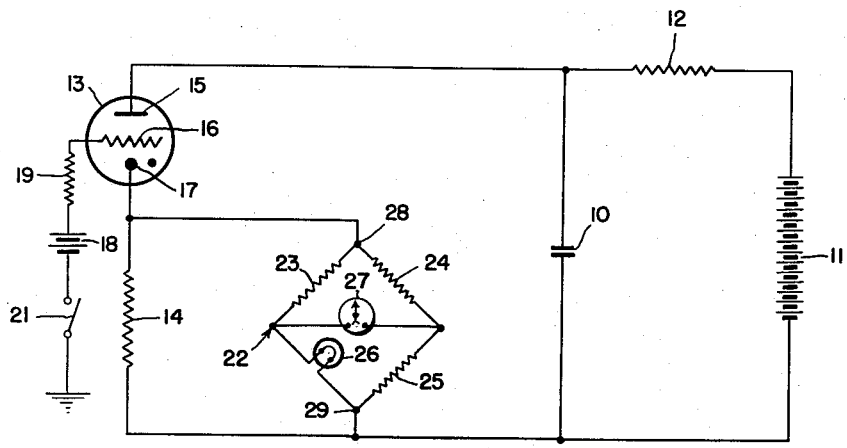

March 8, 1955  R. S. PRESCOTT  2,703,878
TRANSIENT ENERGY INDICATOR
Filed Feb. 13, 1946

Inventor
R. S. Prescott
By M. O. Hayes
Attorney

United States Patent Office

2,703,878
Patented Mar. 8, 1955

2,703,878

TRANSIENT ENERGY INDICATOR

Robert S. Prescott, Washington, D. C.

Application February 13, 1946, Serial No. 647,417

7 Claims. (Cl. 340—253)

(Granted under Title 35, U. S. Code (1952), sec. 266)

This invention relates generally to electrical indicating devices and more particularly to a bridge type indicator adapted to indicate the strength of an energy pulse of short duration such as would be produced by the discharge of a condenser through a gas tube. The term strength of the energy pulse as employed herein is defined as the sufficiency of energy contained in a pulse with respect to a predetermined value of energy.

Essentially, the device of the present invention comprises a Wheatstone bridge three arms of which are formed by resistors and the fourth arm thereof is formed by a suitable non-linear resistance type conductor such, for example, as a light bulb. A D.-C. galvanometer or other suitable instrument is employed in the detector arm of the bridge for the purpose of indicating the direction of current flow therein.

The bridge is balanced for a bulb resistance greater than the cold resistance thereof but less than the maximum hot resistance thereof whereby the bridge will become balanced only when a value of current flows therein which will cause the bulb resistance to be of the correct value for bridge balance. Thus, a pulse containing a predetermined amount or value of energy is required to balance the bridge. A current flow greater than this value will cause the bridge to go out of balance in an assumed positive direction and a current flow less than this value will cause the bridge to go out of balance in an assumed negative direction, the direction of unbalance being manifested by the aforesaid galvanometer.

In accordance with the preferred embodiment of the present invention the bridge circuit heretofore described is employed with the exception that the galvanometer is replaced by a polarized relay adapted to be operated in either direction selectively in accordance with the direction of unbalance of the bridge. In the event that an energy pulse of a strength greater than the predetermined value is applied to the input terminals of the bridge circuit, the relay is operated in such a manner as to cause certain circuit means to be set in operation and remain in operation until the relay is reset manually, thereby to give a continuous indication of the strength of the energy pulse. If, however, an energy pulse of a strength less than the predetermined value is applied to the input terminals of the bridge circuit, the relay is operated in such a manner as to set in operation certain other circuit means adapted to restore the relay to its initial unoperated position.

It is an object of the present invention to provide new and improved means for determining the sufficiency of energy contained in pulses of short duration with respect to a preselected amount.

Another object is the provision of a new and improved energy indicator wherein the unbalance of a bridge circuit is employed to indicate the sufficiency of energy contained in a pulse of short duration applied thereto.

Another object is the provision of a new and improved indicator of the aforedescribed character adapted to give a continuous indication of the sufficiency of energy contained in a pulse until the indicator is reset manually.

Another object is to provide a new and improved energy indicator which is automatically reset to an initial condition thereof when the pulse applied thereto is deficient in energy.

A further object is the provision of an energy indicator which is simple and reliable in operation and economical to manufacture.

Figure 2:
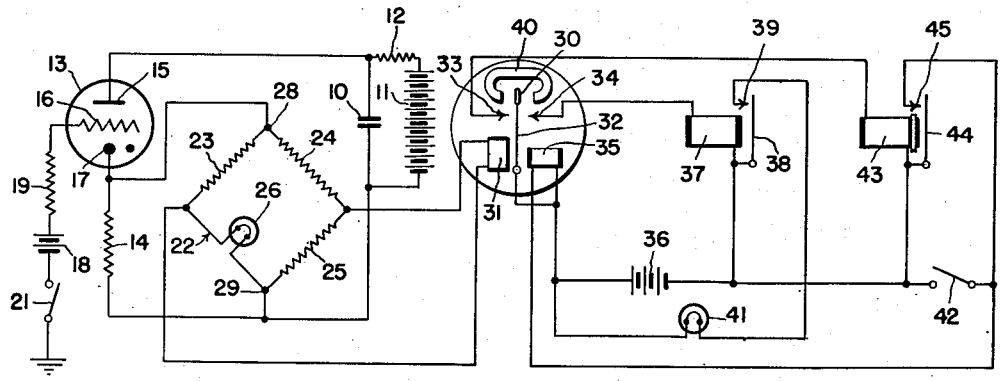

Additional objects and advantages not specifically set forth hereinabove will become more clearly apparent as the description proceeds, reference being had to the accompanying drawing, of which:

Fig. 1 illustrates in diagrammatic form the fundamental circuit of the device of the present invention; and Fig. 2 illustrates in diagrammatic form the complete electrical system of the device of the present invention according to the preferred embodiment thereof.

Referring now to the drawings wherein like characters of reference refer to like parts throughout the several views and more particularly to Fig. 1 thereof, numeral 10 designates a condenser adapted to be charged from a suitable source of D.-C. potential such as battery 11 through a resistor 12. Condenser 10 is provided with a discharge path which comprises a three element cold-cathode gaseous discharge device 13 and a resistor 14, the device 13 having a plate or anode 15, a control grid 16 and a cathode 17. Suitable operating potential is applied to plate 15 from battery 11 through resistor 12. A potential sufficient to cause tube 13 to conduct is applied to the control grid 16 thereof from a battery 18 through a resistor 19, a manually operated normally open switch 21 being included in the grid circuit in order that the tube may be caused to conduct at the proper time. This circuit is disclosed, for example, in the copending application of W. D. Mounce et al. for Mine Firing Control System, Serial No. 500,399, filed August 28, 1943, a detonator being connected across resistor 14 rather than the bridge circuit, hereinafter to be described, and the potential on grid 16 being developed by control circuits associated therewith. The bridge circuit provides a means for measuring the sufficiency of energy which otherwise would be supplied to the detonator.

Connected across the resistor 14 is a bridge circuit preferably of the Wheatstone type indicated generally by the numeral 22. Three of the balancing arms of the bridge circuit are made of conventional resistors 23, 24 and 25 and the fourth arm consists of a suitable non-linear conductor 26 such, for example, as an incandescent lamp whose resistance varies non-linearly in accordance with the value of current flow therethrough. The detecting arm of the bridge consists of a D.-C. galvanometer which is adapted to be deflected to either side of a null or zero position selectively in accordance with the direction of current flow therethrough. A resistance of the lamp 26 is chosen as heretofore described such that the bridge will be balanced only for a value of current flow which will make the lamp resistance equal to that chosen for balance.

When switch 21 is closed, tube 13 is caused to conduct and condenser 10 discharges through the tube and resistor 14 and bridge 22 in parallel therewith. The energy pulse thus applied to the bridge will produce one of three effects on the bridge depending upon the amount of energy contained in the pulse.

If the energy contained in the pulse is sufficient to heat the lamp 26 beyond the resistance required for balance, the lamp will burn brightly and the galvanometer will kick to the right. The result is produced in the following manner. At the instant the pulse is applied to terminals 28 and 29, current is caused to flow from terminal 28 through resistor 23 and lamp 26 to terminal 29, and from terminal 28 through resistor 24, meter 27 and lamp 26 to terminal 29 by reason of the low value of cold resistance of lamp 26 compared with the value of resistor 25. The period of the meter, however, is such that the meter is not deflected to the left from the null position thereof at this time. As the period of the meter is reached sufficient energy is contained in the pulse to bring the resistance of the lamp through the value thereof chosen for bridge balance and the current flow in the meter is thereby reversed, the current being caused to flow from terminal 28 through resistor 23, meter 27 and resistor 25 to terminal 29 thereby causing the meter to kick to the right.

In the event that the amount of energy contained in the pulse is less than the preselected value, the lamp is caused to burn dimly and the value of resistance thereof is not raised to the value required for bridge balance and the direction of current flow in the meter is not reversed. When the period of the meter has elapsed, the meter is caused to kick to the left thus indicating the deficiency of energy in the pulse.

If the quantity of energy contained in the applied pulse is exactly equal to the preselected value, the lamp will flash but the meter will remain in the null position thereof. In this case, the time required to heat the lamp to the balance resistance is equal to the period of the meter such that as the meter period elapses the bridge is balanced and no current flows through the meter.

It will be understood, of course, that as the energy pulse is applied, the amount of energy contained therein is being dissipated such that in the first two cases described above only one kick of the meter is produced, the energy content being too small to thereafter operate the meter. In the last case the meter remains unoperated even as the resistance of the lamp decreases by reason of the small amount of energy available. From the foregoing, it further will be understood that the period of the meter must be longer than the time required to dissipate the maximum amount of energy available in the pulse otherwise it would be inconvenient and difficult to observe the deflections of the meter to determine the sufficiency of energy contained in the pulse. In the first case heretofore described, if the duration of the pulse was longer than the period of the meter, the meter would first deflect to the left and thereafter deflect to the right as the current flow therethrough reverses.

Referring to Fig. 2 of the accompanying drawing, there is shown thereon a complete electrical system adapted to give a continuous indication of the sufficiency of energy in a pulse until the system has been reset manually. In this, the preferred embodiment of the present invention, the detector arm of the bridge circuit 22 consists of a sensitive polarized relay 31 having a movable armature 32 and stationary contacts 33 and 34, the armature being adapted to engage one of the contacts selectively in accordance with the direction of flow of current through the relay. The relay is further provided with a reset magnet 35 which, when energized, is adapted to restore the armature of the relay to its initial position intermediate contacts 33 and 34. This resetting is accomplished by a pair of reset arms, extensions of which are actuated by the end of the reset magnet armature. The reset arms are pivotally mounted on the relay base and are spring urged in opposite directions out of engagement with the contact arm 32. As the reset magnet is energized, a member on the armature engages the extensions of the reset arms to move the reset arms toward each other and to carry the contact arm away from the magnetic contact and return the contact arm to the zero or neutral setting of the relay. Further details of the reset magnet mechanism are set forth in the patent to A. H. Lamb, 2,062,915 issued December 1, 1936.

The operation of relay 31 in response to current flow therethrough is generally similar to that of the galvanometer of Fig. 1. In case one heretofore described, the armature 32 of relay 31 is caused to move into engagement with contact 34 thereof and is maintained in engagement therewith by reason of keeper 30 engaging permanent magnet 40. When this occurs, a circuit is completed from a battery 36 to another relay 37 energizing this relay and causing the armature 38 thereof to move into engagement with contact 39 thereof, thereby completing a circuit from battery 36 to a lamp 41 to cause the lamp to burn brightly and give a continuous indication of the sufficiency of energy in the pulse applied to the terminals 28 and 29 of the bridge circuit. The lamp may be extinguished and the armature 32 of relay 31 restored to its initial position by closing a manually operated switch 42 which opens the circuit from battery 36 to lamp 41 and completes a circuit from the battery to the reset magnet 35 of relay 31.

When a pulse deficient in energy is applied to the terminals of the bridge circuit, as described in case two above, the armature of relay 31 is caused to move into engagement with contact 33 thereof and to be held in engagement therewith as heretofore described. When this occurs, a circuit is completed from battery 36 to a quick make, slow release relay 43 thus energizing the relay and causing armature 44 thereof to move into engagement with contact 45 thereof, thereby to complete a circuit from the battery to the reset magnet 35 of relay 31. As the armature 32 of relay 31 is restored to its initial position, the circuit to relay 43 is broken and its armature slowly moves into the initial position thereof. By reason of the foregoing arrangement, the lamp 41 is prevented from lighting when a pulse deficient in energy is applied to the bridge circuit and the indicator is automatically restored to its initial unoperated condition.

As regards a quantity of applied energy which would be just sufficient to balance the bridge, as heretofore described, no current will flow through the detector arm of the bridge and relay 31 will remain unoperated as did the galvanometer in the system of Fig. 1.

Briefly stated in summary, the present invention contemplates the provision of a device adapted to indicate the sufficiency of energy contained in a pulse of short duration as compared with a predetermined quantity of energy by applying the pulse to the terminals of a bridge circuit and observing the result on suitable indicating means.

From the foregoing, it readily will be apparent that an energy indicator has been provided which is well adapted to fulfill the aforesaid objects of the invention. While the invention has been described in particularity with reference to examples thereof which give satisfactory results, it readily will be apparent to those skilled in the art to which the invention appertains, after understanding the invention, that further modifications, changes and embodiments may be made therein without departing from the spirit and scope thereof as defined by the claims appended hereto.

The present invention may be manufactured and used by or for the Government of the United States of America for governmental purposes without payment of any royalties thereon or therefor.

What is claimed as new and desired to be secured by Letters Patent of the United States is:

1. In an energy indicator adapted to indicate the deficiency of energy in an electrical pulse of short duration discharged by a normally charged condenser with respect to a pulse of predetermined energy value, the combination of a Wheatstone bridge, a non-linear resistance element in one arm of said bridge for preventing current flow through a portion of the bridge when a pulse of said predetermined value of energy is received by the bridge from said condenser and for causing current to flow in a predetermined direction through said portion of the bridge when a pulse deficient in energy with respect to said predetermined value is received by the bridge from the condenser, electrical indicating means arranged in said portion of the bridge and responsive to the said current flow therein for manifesting said deficiency of energy in the pulse, said indicating means having a lag period at least equal to the time required for said non-linear resistance to attain balance resistance when the energy value of the pulse is equal to said predetermined value, and means for connecting said condenser to said bridge thereby to generate said first named pulse.

2. A device of the character disclosed for indicating the strength of a pulse of energy of short duration produced by a condenser discharged through a normally charged mine firing circuit with respect to an energy pulse of predetermined value comprising, in combination, a Wheatstone bridge for receiving said first named pulse, a non-linear resistance forming one arm of said bridge and having resistance values which deviate from a value producing balance of the bridge selectively in accordance with deviations of said energy pulse from said predetermined value, an electroresponsive device connected in the center arm of said bridge and having an element deflectable from a null position in opposite directions selectively in accordance with the direction of current flow therethrough, said electroresponsive device having a lag period substantially equal to the time required for said non-linear resistance to reach balance resistance when the energy value of the pulse is equal to said predetermined value, and means for connecting said mine firing circuit to said bridge whereby a pulse of energy discharged by the mine firing circuit will cause said element to be moved from said null position in a direction corresponding to the sufficiency or deficiency of the energy of said mine firing circuit with respect to the energy pulse of said predetermined value.

3. A device of the character disclosed for determining the sufficiency or deficiency of an energy pulse of short duration with respect to a pulse of predetermined value produced by a mine firing circuit having a normally charged condenser, a battery for charging said condenser, and a cold cathode tube for discharging said condenser through said device comprising, in combination, a Wheatstone bridge connected in series circuit with said tube for receiving said first named energy pulse when said tube is rendered conducting, a tungsten lamp forming one arm of said bridge for causing said bridge to become balanced when said energy pulse of predetermined value is received thereby, said lamp having a resistance value when the bridge is balanced which is greater than the cold resistance and less than the maximum hot resistance thereof, an indicator connected across the arms of said bridge and having an element deflectable when the bridge is unbalanced after the maximum amount of energy available in the pulse discharged by said condenser has been dissipated in said circuit, said element being deflected in opposite directions from a null position selectively in accordance with the direction of current flow therethrough, said current flow in response to unbalance of the bridge being in opposite directions selectively in accordance with the sufficiency or deficiency of said energy pulse, said element having a lag period such that said element will remain in said null position when the energy pulse discharged by the condenser through the bridge is equal to said predetermined value.

4. A device for comparing the strength of a pulse of energy of short duration discharged by a normally charged condenser with respect to an energy pulse of predetermined value comprising, in combination, an initially unbalanced bridge circuit connected to said condenser and adapted to become balanced when a pulse of energy received thereby from the condenser is equal to said predetermined energy value, a non-linear resistance included in said circuit for causing current to flow in one direction through a portion of the circuit when an energy pulse received by the circuit from the condenser is of greater strength than said predetermined value and for causing current to flow in the opposite direction through said portion of the circuit when an energy pulse received by the circuit from the condenser is of lesser strength, and means included in said portion of the circuit for indicating the direction of current flow therein at the termination of said period, said last-named means having a lag period at least equal to the time required for the maximum amount of energy available in a pulse received by the circuit to be dissipated therein.

5. In a pulsed energy system for indicating pulses of short duration produced by discharge of a condenser forming a portion of a mine firing circuit, comprising, in combination, a Wheatstone bridge including a non-linear resistance element adapted to give visual indication of short duration pulses in excess of a predetermined value produced by said condenser discharge, a sensitive polarized relay responsive to short duration pulses respectively greater than and less than a predetermined value and including resetting means, a relay responsive to pulses in excess of a predetermined pulse value and actuated under control of said sensitive polarized relay, a relay responsive to pulses less than a predetermined value effective to actuate said resetting means thereby to reset said polarized relay, and a signal lamp energized upon impression on said bridge of a short duration pulse in excess of said predetermined value, said signal lamp providing a visual indication of such excess condition in the system and being of longer duration than the visual indication of said non-linear resistance element.

6. In a pulse energy system for indicating pulses of short duration produced by discharge of a condenser forming a portion of a mine firing circuit, comprising, in combination, a Wheatstone bridge including a non-linear resistance element adapted to give a visual indication of short duration pulses in excess of a predetermined value produced by said condenser discharge, a sensitive polarized relay including resetting means and responsive to short duration pulses greater than and less than a predetermined pulse value and including a first normally open contact adapted to be closed upon impression of a short duration pulse across said bridge of less than a predetermined value, a first relay connected to said contact for resetting said sensitive polarized relay to normal position as the contact is closed, a second contact on said polarized relay and adapted to be closed upon impression of a short duration pulse across said bridge in excess of a predetermined value, a second relay connected to said second contact and adapted to energize a signal lamp in circuit with said second relay as the second relay is operated, said signal lamp providing a visual indication of such excess pulse condition for a period of longer duration than the indication of said non-linear resistance element.

7. A device for indicating the strength of a short duration pulse of energy produced by a condenser discharge comprising, in combination, an initially unbalanced circuit for receiving the short duration pulse of energy, a non-linear resistance included in said circuit and adapted to cause the circuit to become balanced when an energy pulse of predetermined value is passed therethrough, said non-linear resistance causing current to flow in one direction through a portion of said circuit when an energy pulse of greater strength than said predetermined value is passed therethrough and causing current to flow in an opposite direction through said portion of said circuit when an energy pulse of lesser strength than said predetermined value is passed therethrough, a polarized relay included in said portion of the circuit and having an element movable into either one of two circuit closing positions selectively in accordance with the direction of current flow through said portion of the circuit, means effective as said element moves into one of said circuit closing positions to give a continuous visual indication that the applied pulse is of greater strength than said predetermined value, and means effective as said element moves into the other of said circuit closing positions to restore the relay element to the initial position thereof.

References Cited in the file of this patent

UNITED STATES PATENTS

| Number | Name | Date |
|---|---|---|
| 1,326,304 | Swan | Dec. 30, 1919 |
| 1,590,420 | Chubb | June 29, 1926 |
| 1,663,086 | Long | Mar. 20, 1928 |
| 1,901,741 | Fetsch | Mar. 14, 1933 |
| 2,221,069 | Andrieu | Nov. 12, 1940 |
| 2,270,991 | Bagno | Jan. 27, 1942 |
| 2,285,482 | Wunsch | June 9, 1942 |
| 2,385,976 | Evans et al. | Oct. 2, 1945 |
| 2,431,915 | Burchfield | Dec. 2, 1947 |
| 2,431,992 | Dalzell | Dec. 2, 1947 |
| 2,498,103 | Wojciechowski | Feb. 21, 1950 |
| 2,577,543 | Saad | Dec. 4, 1951 |